US010176691B2

(12) United States Patent
Smoak

(10) Patent No.: US 10,176,691 B2
(45) Date of Patent: Jan. 8, 2019

(54) TRACKING AND MONITORING SYSTEM

(71) Applicant: SBTD, LLC, West Melbourne, FL (US)

(72) Inventor: Rachanee L. Smoak, West melbourne, FL (US)

(73) Assignee: Rachanee L. Smoak, Rio Rancho, NM (US)

( * ) Notice: Subject to any disclaimer, the term of this patent is extended or adjusted under 35 U.S.C. 154(b) by 0 days.

(21) Appl. No.: 15/615,956

(22) Filed: Jun. 7, 2017

(65) Prior Publication Data
US 2018/0357876 A1    Dec. 13, 2018

(51) Int. Cl.
*G08B 21/02* (2006.01)
*G01S 5/00* (2006.01)
*G01S 5/02* (2010.01)

(52) U.S. Cl.
CPC ........ *G08B 21/0202* (2013.01); *G01S 5/0027* (2013.01); *G01S 5/0294* (2013.01); *G08B 21/028* (2013.01); *G08B 21/0288* (2013.01); *G08B 21/0294* (2013.01)

(58) Field of Classification Search
CPC ..... G01S 5/0027; G01S 5/0294; A43B 3/001; A43B 3/0015; A43B 3/0021; A43B 3/005; A61B 5/0022; A63B 24/0062; G08B 15/001; G08B 21/02; G08B 21/0202; G08B 21/028; G08B 21/0288; G08B 21/0294; G08B 21/24; H04W 4/008; H04W 4/02
USPC .................................................... 340/539.13
See application file for complete search history.

(56) References Cited

U.S. PATENT DOCUMENTS

| 5,615,111 | A | * | 3/1997 | Raskas | A43B 3/00 36/136 |
| 6,273,027 | B1 | * | 8/2001 | Watson | A01K 15/02 119/712 |
| 6,808,462 | B2 | * | 10/2004 | Snyder | A43B 3/00 36/1 |
| 7,673,907 | B2 | * | 3/2010 | Nenov | A63C 3/00 280/811 |
| 8,021,269 | B2 | * | 9/2011 | Jung | A43B 3/0005 482/4 |
| 2007/0201221 | A1 | * | 8/2007 | Cherdak | A43B 3/0005 362/103 |
| 2009/0040053 | A1 | * | 2/2009 | White | G08B 21/24 340/573.4 |

(Continued)

*Primary Examiner* — Quan-Zhen Wang
*Assistant Examiner* — Stephen R Burgdorf
(74) *Attorney, Agent, or Firm* — Mark Malek; Stephen Bullock; Widerman Malek, PL

(57) ABSTRACT

A tracking and monitoring shoe that includes a tracking device comprising a controller, a battery in electrical communication with at least one solenoid and at least one permanent magnet, a plurality of lights, a microphone, and a speaker. The tracking device may be implanted within a portion of the shoe, defined as the tracking section. The plurality of lights may be operable to emit light from a sole of the shoe and the plurality of lights and the tracking device may be electrically connected to the battery. The battery may be configured to be rechargeable when a walking motion translates the at least one permanent magnet. Furthermore, the tracking device may be configured to activate the plurality of lights, microphone, and speaker when the tracking device detects the shoe has reached or transcended a boundary.

19 Claims, 8 Drawing Sheets

(56) References Cited

U.S. PATENT DOCUMENTS

| | | | | |
|---|---|---|---|---|
| 2012/0260522 A1* | 10/2012 | Shi | ................... | A43B 1/0054 |
| | | | | 36/2.6 |
| 2014/0099972 A1* | 4/2014 | Weiss | ............... | G08B 21/0446 |
| | | | | 455/456.2 |
| 2015/0382138 A1* | 12/2015 | Bose | ................... | H04L 51/10 |
| | | | | 455/456.3 |
| 2016/0078739 A1* | 3/2016 | Burton | ............ | G08B 21/0446 |
| | | | | 340/539.11 |

* cited by examiner

TRACKING AND MONITORING SYSTEM

FIELD OF THE INVENTION

The present invention relates to systems and methods for tracking and, more specifically, to the field of tracking devices used to locate individuals.

BACKGROUND

There exists a need in the art for a discrete tracking device designed to protect vulnerable segments of society from becoming lost or abducted. Children and individuals with compromised mental abilities need to be given supervised freedom to move about a designated area on their own volition. In order to maintain their dignity as well as not interfere with daily activities, the device needs to be discretely worn as clothing or a clothing accessory. Furthermore, concealment of the device within clothing prevents the device's removal by a would-be criminal.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems and methods for tracking and, more specifically, to the field of tracking devices embedded within apparel used to locate individuals.

More specifically, one embodiment of the present invention describes a tracking and monitoring shoe that includes a tracking device comprising a controller, a battery in electrical communication with at least one solenoid and at least one permanent magnet, a plurality of lights, a microphone, and a speaker. The tracking device may be implanted within a portion of the shoe, defined as the tracking section. The plurality of lights may be operable to emit light from a sole of the shoe and the plurality of lights and the tracking device may be electrically connected to the battery. The battery may be configured to be rechargeable when a walking motion translates the at least one permanent magnet. Furthermore, the tracking device may be configured to activate the plurality of lights, microphone, and speaker when the tracking device detects the shoe has reached or transcended a boundary.

In some embodiments the at least one solenoid and the at least one permanent magnet may be vertically oriented with respect to a solenoid longitudinal axis. In this orientation, the at least one solenoid may be configured as spring support for the shoe.

In some embodiments the at least one solenoid may be a plurality of solenoids and the at least one permanent magnet may be a plurality of permanent magnets. Each solenoid of the plurality of solenoids may correspond to a permanent magnet of the plurality of permanent magnets, defining a plurality of solenoid-magnet pairs. Additionally, the plurality of solenoid-magnet pairs may be distributed in one of a vertical, horizontal, angled, and curved orientation with respect to a longitudinal axis of the shoe.

In some embodiments the tracking and monitoring shoe may include a tracking device operable to activate an alarm projected through the speaker when the shoe reaches or transcends a boundary. In some embodiments the alarm may be a pre-recorded message.

The tracking and monitoring shoe may also include a controller that further comprises one of a SIM card, a Bluetooth transmitter, a radio transmitter, and a WiFi transmitter and may be operable to communicate pre-stored information, including at least one of fingerprints, photographic identification, aliases, health conditions, and home address to a central server when the shoe reaches or transcends a boundary.

In some embodiments the tracking and monitoring shoe may include a plurality of lights operable to emit a first colored light when the shoe reaches a distance within the boundary. Likewise, the plurality of lights may be operable to emit a second colored light when the shoe reaches or transcends a boundary and may be operable to blink when the shoe reaches a preset distance within the boundary.

In some embodiments the tracking and monitoring shoe may further include one of a heat sensor and pulse monitor configured to detect whether the shoe has been removed from a user's body. If removed from a user's body, the shoe may be operable to transmit pre-stored information to a central server when a condition based on the shoe's removal has not been met.

Another embodiment of the invention may include tracking and monitoring apparel including a tracking device with a controller, a solenoid, a magnet, a plurality of lights, a microphone and a speaker. The embodiment may also include a battery in electrical communication with the solenoid, the magnet, the plurality of lights, and the tracking device. In this embodiment the tracking device may be connected to the apparel and the plurality of lights may be configured to emit light from the apparel. The battery may be configured to be rechargeable when motion translates the magnet within the solenoid. Also, the tracking device may be configured to activate at least one of the plurality of lights, microphone, and speaker when the tracking device detects the apparel has transcended a boundary. In this embodiment the apparel may be worn as one of an article of clothing and a clothing accessory. By way of example, the apparel may be one of a shoe, a wrist band, an ankle band, a necklace, a headband, eyeglasses, a hair tie, a ring, socks, shoes, pants, a hat, and a shirt.

This embodiment may be operable to activate one of an alarm or pre-recorded message to project through the speakers when the apparel reaches or transcends a boundary. Furthermore, the tracking and monitoring apparel may be operable to communicate pre-stored information to a central server for processing when the apparel reaches or transcends the boundary. The pre-stored information may include at least one of fingerprints, photographic identification, aliases, health conditions, and home address.

In this embodiment the plurality of lights may be operable to emit a first colored light, defined as a caution light, when the apparel reaches a preset distance within the boundary. Additionally, the plurality of lights may be operable to emit a second colored light, defined as a warning light, when the apparel reaches or transcends the boundary. Furthermore, the plurality of lights may be operable to blink when the apparel reaches a distance within the boundary.

Another embodiment of the invention may be a shoe sole including a tracking device comprising a controller, a battery in electrical communication with a solenoid and a magnet, a plurality of lights, a microphone, and a speaker. The tracking device may be implanted within a sole of the shoe and the plurality of lights may be operable to emit light from the shoe sole. The plurality of lights and the tracking device may be electrically connected to the battery, which may be operable to be rechargeable when motion translates the magnet within the solenoid. In this embodiment the tracking device may be operable to activate at least one of the plurality of lights, microphone, and speaker when the tracking device detects the shoe sole has transcended a preprogrammed boundary. The tracking device may be operable to be in communication with a web-based program including a database comprising biometric data of the shoe sole wearer including at least one of fingerprints, photographic identification, aliases, health conditions, and a home address into a database that is in communication with the controller. Additionally, the controller may be operable to be in communication with a global system for mobile communication network and the tracking device controller may be operable to include a preprogrammed boundary, defined as a safe zone. In this embodiment the tracking device may be operable to communicate with a web based program with preset rules regarding the tracking device's distance to the preprogrammed boundary. The tracking device may also be operable to send signal data to the web based program that an alert with the biometric data should be sent to a third party when one or more of the preset rules are not in compliance with a preset standard.

In this embodiment, the preset rules may rely on at least one of a time of day, a day of the week, a distance away from the safe zone, and manual override. Furthermore, the shoe sole may be operable to activate at least one of the plurality of lights, the microphone, and the speakers when the tracking device has transcended the safe zone and the preset rules are not in compliance with the preset standard.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
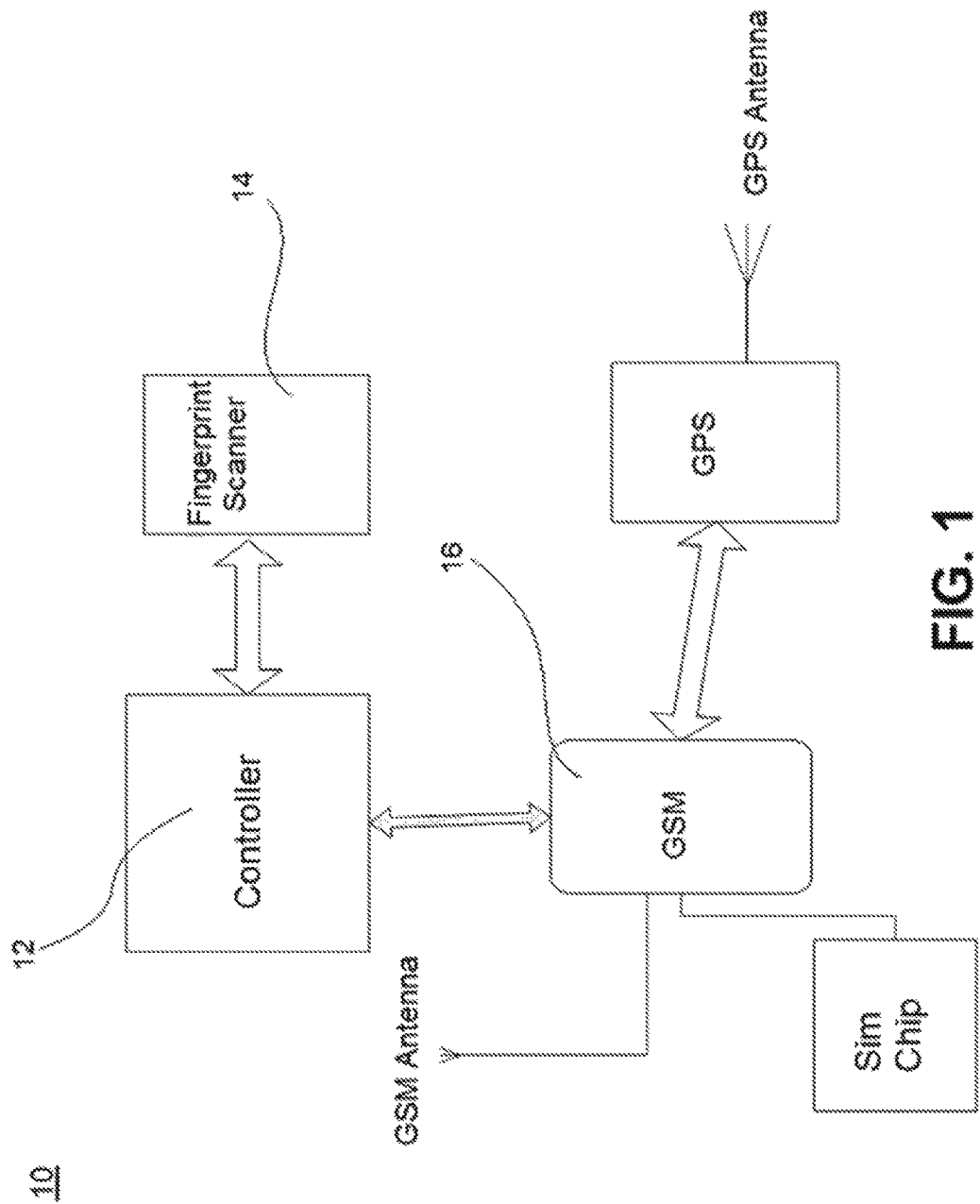
FIG. 1 is a schematic diagram of a tracking system according to the present invention.

Referring now to FIG. 1, an embodiment of the present invention may be directed to a tracking system 10 that may advantageously be used to track the location of persons. More specifically, the tracking system 10 may be used to track children and the elderly who may be suffering from mental impairment, such as, for example, Alzheimer's or dementia. With respect to children, they can sometimes wander away from their parents, but in some terrible scenarios, they can be the victims of crimes. The tracking system 10 according to the present invention may advantageously provide a location for a child that is missing.

The tracking system 10 may include a small surveillance biometric tracking device designed to be concealed and hidden from a possible criminal offender. For example, in the case that was mentioned above, i.e., a child is kidnapped, the criminal offender would likely attempt to remove a device associated with the tracking system if it were readily visible. However, the device associated with the tracking system 10 according to the present invention can be concealed so as not to be noticeable to such a criminal offender.

Figure 3:
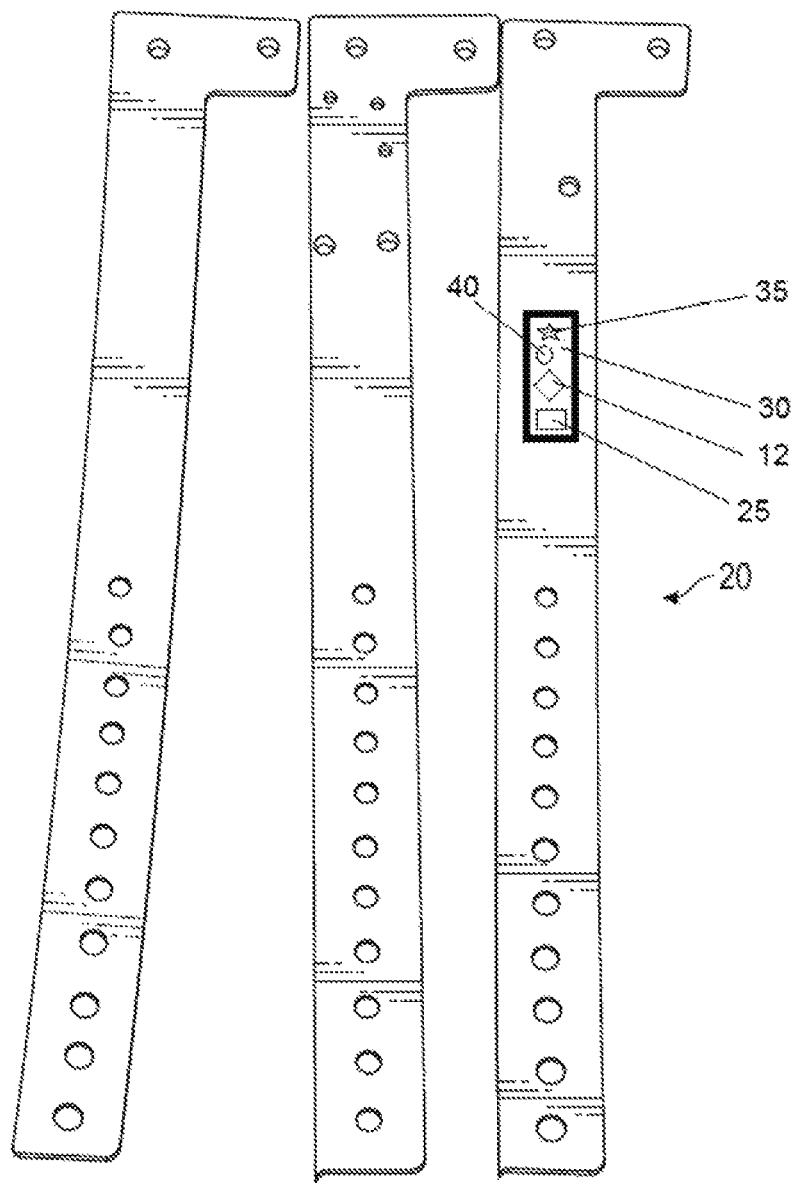
FIG. 3 is a type of bracelet that may be used in connection with a tracking system according to the present invention.
Figure 4:
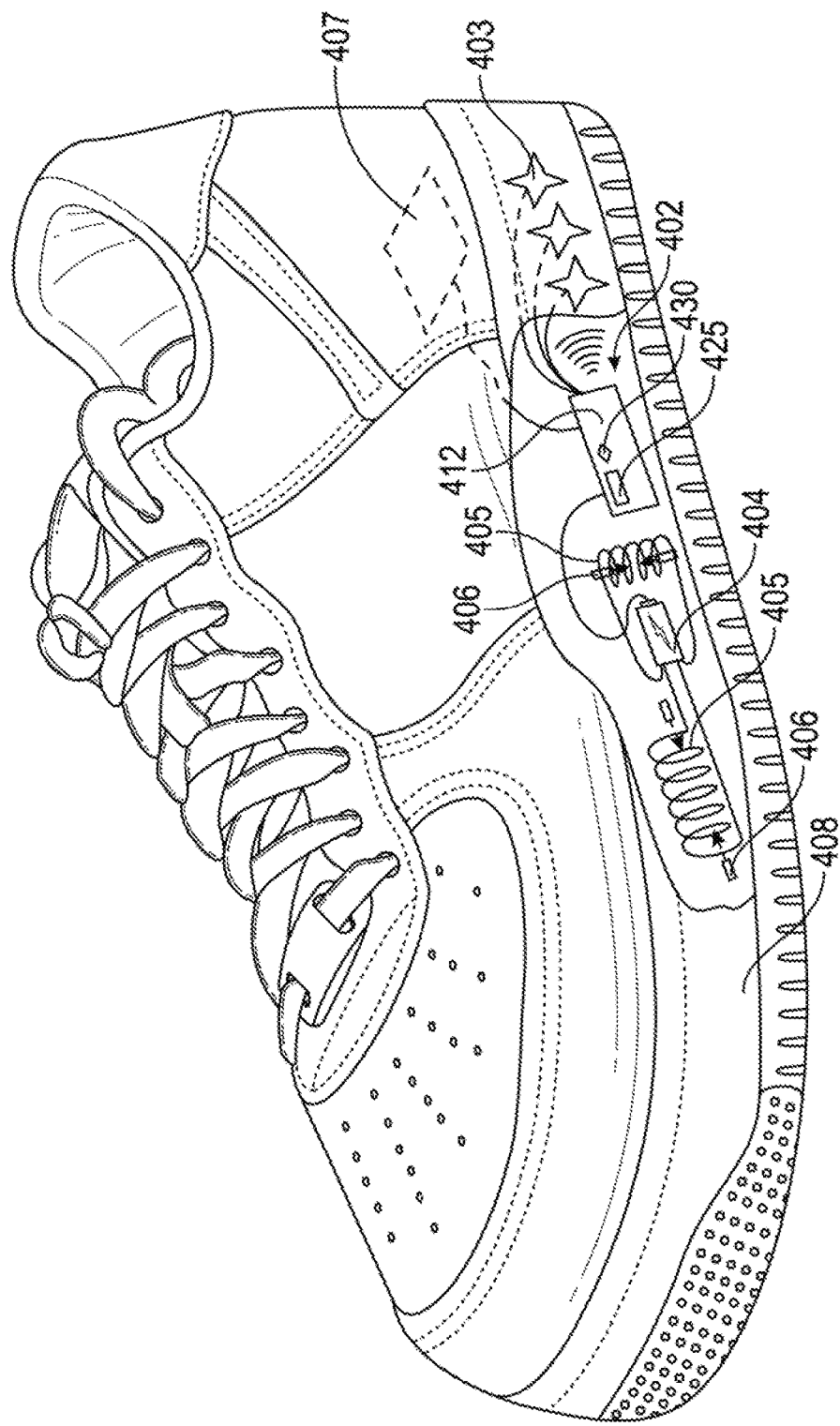
FIG. 4 is a perspective view of an embodiment of the invention comprising a cutaway that includes a tracking and monitoring device incorporated into a shoe.

As perhaps best illustrated in FIGS. 1, 3 and 4, the tracking system 10 may include a controller 12, 412. The controller 12, 412 may, for example, be a peripheral interface controller, or a PIC microcontroller. In one embodiment, the controller 12, 412 may be carried by a tracking device 30, 402 located within or on a shoe, shoe sole, a wrist band, an ankle band, a necklace, a headband, eyeglasses, a hair tie, a ring, socks, shoes, pants, hat, shirt, bracelet or a watch, to be worn by the person to be located. The tracking device 30, 402 having the controller 12, 412 carried therein, however, is preferably something that can be concealed within the clothing of the person to be located. For example, the tracking device 30, 402 may be adaptable to be carried by an article of clothing, and may even be small enough to act as a button on clothing.

As illustrated in FIG. 1, the controller 12 may have an integrated fingerprint scanner 14, or may be positioned in communication with a fingerprint scanner. Accordingly, upon receiving the controller 12, the user may connect it to a computer and capture a fingerprint scan of the person to be located. This fingerprint scan may be stored in a secured database. In some embodiments, the tracking device 30, 402 having the controller 12, 412 incorporated therein may include the fingerprint scanner 14 incorporated therein. In such an embodiment, the device may be powered by an external power source, e.g., a USB connection to the computer, or a mini USB connection to be plugged into an external power source, such as AC power at a structure. Upon powering up the tracking device 30, 402 having the controller 12, 412 incorporated therein, the user may be prompted to provide fingerprint data to be stored in the database using the fingerprint scanner 14.

Upon uploading the fingerprint scan that was captured using the fingerprint scanner 14 to the database, a user may be prompted to upload additional information relating to the person to be located. Such information may include, for example, photographic identification, home address, contact information such as phone and email, date of birth, health conditions, various pictures, alternate aliases, or any other type of information that would be helpful in locating someone.

The tracking device 30, 402 having the controller 12, 412 incorporated therein may be positioned in communication with a cellular communication network, such as, for example, a Global System for Mobile (GSM) communication network 16. This advantageously allows the information associated with the person to be located to be readily accessible, and also may allow for the device having the controller 12, 412 incorporated therein to be readily locatable using a GPS tracking system associated with most GSM networks. It is contemplated and included within the scope of the invention that the controller 12, 412 may be placed in communication with any other type of cellular communication network, including, but not limited to, a Code Division Multiple Access (CDMA) network.

As illustrated by FIG. 3, the mobile device associated with the GSM communication network 16 may include a Subscriber Identity Module (SIM) chip 25 and a GPS tracking system 35. A SIM chip 25 may be provided by an integrated circuit that securely stores international mobile subscriber identity (IMS) and related information used to identify and authenticate subscribers on a GSM network. A SIM circuit may be embedded into a removable plastic card which may be called a SIM card. SIM cards may generally be transferable between mobile devices, and each SIM card may have a unique serial number (ICCID). In alternative embodiments, the tracking system 10 may include a Bluetooth transmitter, a radio transmitter, or a WiFi transmitter instead of a SIM chip 25 to communicate the pre-stored information or to signal a central server containing the pre-stored information that the information should be sent to another party.

Upon uploading information relating to the person to be located to the database, a user may use the tracking system 10 according to the present invention to track the location of the person to be located, or to ensure that the person to be located has not left a particular area. Therefore, the user may define areas that can be considered "safe zones 18," i.e., those areas where a person to be located is likely safe. For example, in the case of a child, a safe zone 18 can be considered the child's school, home, friend's house, or other places that the child's parent and/or guardian may deem to be considered safe. In the case of an elderly patient that may suffer from a degenerative mental state or capacity, the safe zone 18 may be considered the patient's room, the patient's home, or the institution where the patient is residing. The predefined areas may be changed, enlarged, reduced, or otherwise controlled.

Further, predefined areas that are safe zones 18 may be defined for certain times of the day. For example, it may be expected that a child is within the predefined area that is the "home area" at a certain time of the day. If the child is not within the "home area" during that certain time of the day, an alert may be sent indicating that the child is lost, or outside of the "home area" at the particular time. This indication is sent regardless of whether the location of the child is determined to be within an alternate safe zone 18 or predefined area. To be specific, if the child is scheduled to be within the "home area" between the hours of noon and 2 PM, and it is determined that the child is within the "school area," which may also be considered a "safe zone 18," during that time period, an alert may be sent indicating that the child is not within the designated area during the designated time.

As another example, when the person to be located is an elderly patient, or an elderly person that may be suffering from Alzheimer's disease and/or dementia, the predefined areas may be associated with safe areas that the elderly patient may be located and secured to prevent them from wandering off. Those skilled in the art will appreciate that over time, there has been a rise in disappearance of elderly people, which has prompted the use of the Silver Alert. The tracking system 10 according to the present invention advantageously allows for various zones to be defined for such patients. For example, one safe zone 18 may be a care facility where the elderly patient may be living. Another safe zone 18 may be for a courtyard right outside of the care facility where the elderly patient may be living. Furthermore, the system may include boundaries within each safe zone 18 that may trigger the tracking device 30, 402 to issue a warning that the safe zone 18 is about to be transcended.

Figure 2:
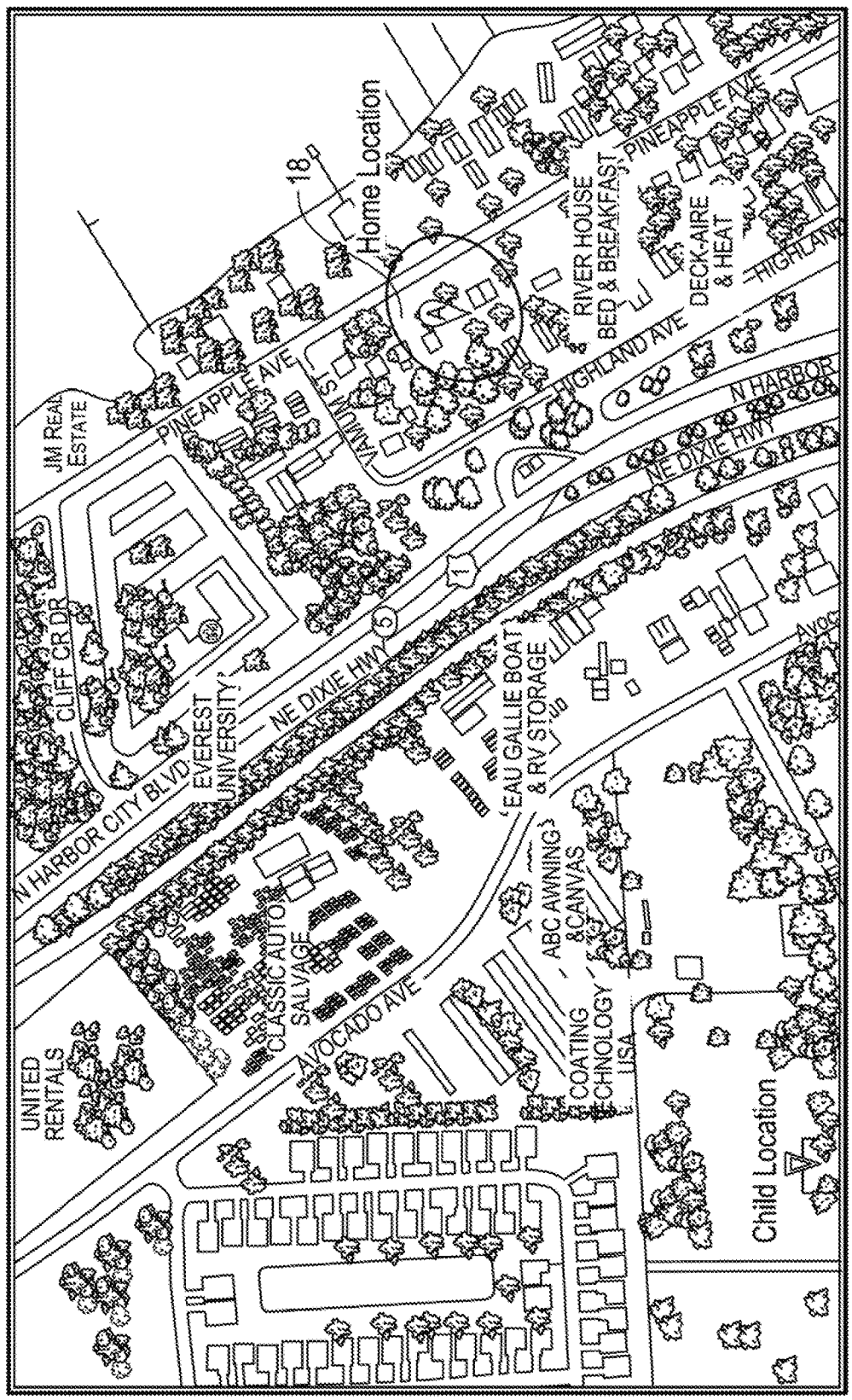
FIG. 2 is an aerial view of a mapped area showing a location of the detected person using the tracking system according to the present invention.

The tracking system 10 according to embodiments of the present invention allows for the safe zones 18 to be defined by geographical location as well as by area. More specifically, it is contemplated that a user of the tracking system 10 may access an on-line map when registering the tracking device 30, 402 having the controller 12, 412 associated therewith that allows the user to define certain zones. For example, and with reference to FIG. 2, the safe zone 18 may be set as a perimeter around the home location. The size of the safe zone 18 may be set by the user as well. If the user wanted to increase the size of the safe zone 18 to allow the person to be located to freely move around a larger area, the user can readily select a larger safe zone 18 to allow for such a desire. Similarly, if the user desires to decrease the safe zone 18 such as, for example, to within the structure at the "home zone," then the user can readily make such an adjustment and define the structure as the safe zone 18.

As indicated above, the tracking device 30, 402 having the controller 12, 412 associated therewith may be a wrist worn device, a shoe, a shoe sole, or may be a device that can be worn as clothing and clothing accessories or hidden therein. By way of non-limiting example, the tracking device 30, 402 and associated controller 12, 412 may be worn as a shoe, a wrist band, watch, ankle band, a necklace, a headband, eyeglasses, a hair tie, a ring, socks, shoes, pants, a hat, and/or a shirt.

Referring now, more specifically, to FIG. 3, another type of biometric tracking device 20 is now defined in greater detail. The biometric tracking device 20 illustrated in FIG. 3 is a typical band that may be connected to the person to be located. This may be similar to a wristband that may be worn by a patient in a hospital. The biometric tracking device 20 illustrated in FIG. 3 may include the controller 12 incorporated therein. Further, the biometric tracking device 20 may not be readily noticeable to a person to be located as it may appear to simply be a typical hospital band. Accordingly, the biometric tracking device 20 illustrated in FIG. 3, may be a vinyl durable band used in a hospital, daycare or nursing home setting.

The biometric tracking device 20 may include a radio frequency identification (RFID) chip 40. The RFID chip 40 may receive and transmit signals to an RFID repeater. RFID signals indicating the location of the wearer of the biometric tracking device 20 may be stored in the database to advantageously allow for tracking of movement of the person to be located.

The biometric tracking device 20 may further include a built-in microphone and speaker system that may trigger when the device 20 has been activated. The microphone may allow for a person monitoring the tracking system to hear the environment surrounding the tracked person. The speaker system may allow for the monitor to speak to the tracked person and/or a would-be assailant.

In one embodiment, as depicted in FIG. 4, a tracking device 402 may be embedded within a person's apparel. As depicted in FIG. 4, the apparel may be a shoe 400. In this embodiment, the tracking device 402 may include a controller 412 coordinating operation of its electrical componentry. Additionally, the controller 412 may contain a communication device 425 such as a SIM chip, a Bluetooth transmitter, a radio transmitter, or a WiFi transmitter. The communication device 425 may be activated by the controller 412 when a location device 430 therein indicates to the controller 412 that a boundary has been approached or transcended. The location device 430 may be a GPS device or may be a WiFi enabled device that coordinates with a WiFi hub located within the safe zone 18, or in some embodiments may be a Radio Frequency Identification (RFID) transponder that communicates with a transceiver and decoder within the safe zone 18.

In some embodiments, a tracking device 402 may be positioned at least one of partially and entirely within a sole 401 of the shoe 400. Although this embodiment depicts the tracking device 402 only within the sole 408 of the shoe 400, it is contemplated to be within the scope of this application that the tracking device 402 may be in other parts of the shoe including a shoe tongue, a pocket located on the shoe, inside the shoe, or inserted, interwoven, or attached to the shoe material. In the FIG. 4 embodiment, the tracking device 402 may include lights 403 positioned on the shoe 400 so as to emit light that is visible in the environment around the shoe 400. These lights 403 may serve as warning lights when activated. They may also assist with locating the person wearing the shoe 400 when activated and may further draw attention to the wearer that warning notifications have been sent to a server and/or a monitor of the safe zone 18. Likewise, in some embodiments the shoe 400 and/or the tracking device 402 embedded within the shoe 400 may include an alarm or siren that sounds when activated. In other embodiments, the alarm may be replaced with a pre-recorded message that may serve as a warning or a reminder.

The tracking, device 402 may be configured to activate at least one of the plurality of lights 403, a microphone (not shown), and a speaker (not shown) when the location device 430 detects the apparel has transcended a boundary. Likewise, the lights 403, microphone and speaker may be activated when the shoe 400 reaches a distance within the predefined boundary. By way of non-limiting example, the lights 403 may emit a first colored cautionary light, such as yellow, when the shoe 400 reaches a distance within the predefined boundary. Furthermore, the lights 403 may emit a second colored warning light, such as red, when the shoe 400 reaches or transcends the predefined boundary. Furthermore, the lights 403 may be programmed to blink when either or both of the colors is emitted due to a preset boundary being reached or transcended. Additionally, a cautionary and warning message may accompany or replace the first and second colored lights when a preset boundary has been reached or transcended.

In some embodiments the shoe 400, may include a sensor 407 such as a heat sensor or pulse monitor that is operable to detect when the shoe 400 or apparel has been removed. If the sensor 407 no longer detects body heat or a pulse, the controller 412 may retrieve the pre-stored information and may utilize the communication device 425 to transmit the user's pre-stored information, including background information, to a central server when a condition based on the shoe's 400 removal has not been met. Such a condition, by way of non-limiting example, may include the sensor 407 reaching a predefined temperature for two minutes or longer, or that a deactivation button or code has not been entered.

The tracking device 402 may be connected to, and rely on a battery 404 for energy. In some embodiments, the battery 404 may be a lithium ion battery. The battery 404 may be rechargeable with the walking motion of the person wearing the shoe 400. In some embodiments, recharging capability may be accomplished by the sole 401 of the shoe 400 including a defined void whereby a solenoid 405 and magnet 406 are positioned therein. In some embodiments the magnet 406 may be a permanent magnet. The walking motion of the person wearing the shoe 400 may cause the magnet 406 to translate within the solenoid 405 and the resulting electromagnetic induction may send energy to be stored within the battery 404 for later usage. In some embodiments, the battery 404 itself may include the solenoid 405 and magnet 406.

The solenoid 405 may be positioned to where its longitudinal axis is parallel to the longitudinal axis of the shoe 400. In this embodiment, the magnet 406 may slide backward and forward through the solenoid 405 with the back and forth motion of a person's foot when walking. However, other embodiments may orient the solenoid 405 in a vertical positioning wherein the longitudinal axis is perpendicular to the longitudinal axis of the shoe 400. In this embodiment, the magnet 406 may move up and down through the solenoid 405 relative to the up and down motion of a wearer's shoe 400 being lifted off the ground and replaced. However, one skilled in the art will appreciate that any orientation of the solenoid 405 and magnet 406 within the shoe 400 that facilitates electromagnetic induction to produce current to the battery 404 is anticipated to be within the scope of this application. This may include curved as well as vertical, horizontal, and angled orientations with respect to the longitudinal axis of the shoe 400. Likewise, the different orientations may not be mutually exclusive. Meaning, there may be a plurality of solenoid 405 and magnet 406 pairs positioned in a variety of orientations to capture more subtle motions in a person's walking motion. As an added benefit, the coiled nature of the solenoid 405 may be configured to provide spring cushioning to the sole 401 of a shoe 400.

Figure 4A:
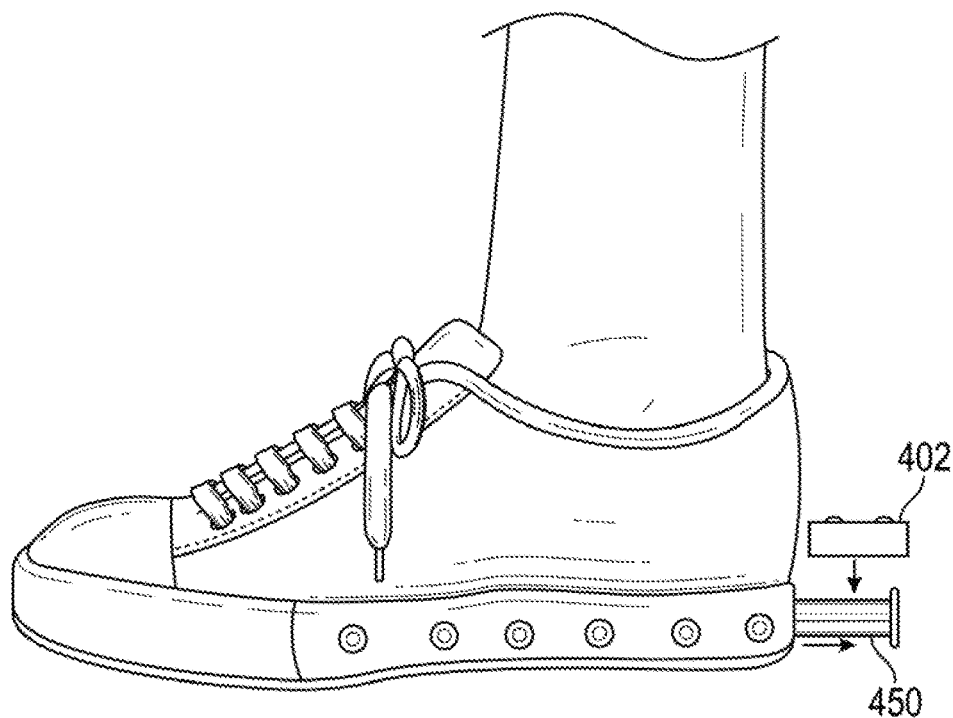
FIG. 4a is a side view of a removable portion of tracking and monitoring device incorporated into a shoe.
Figure 4B:
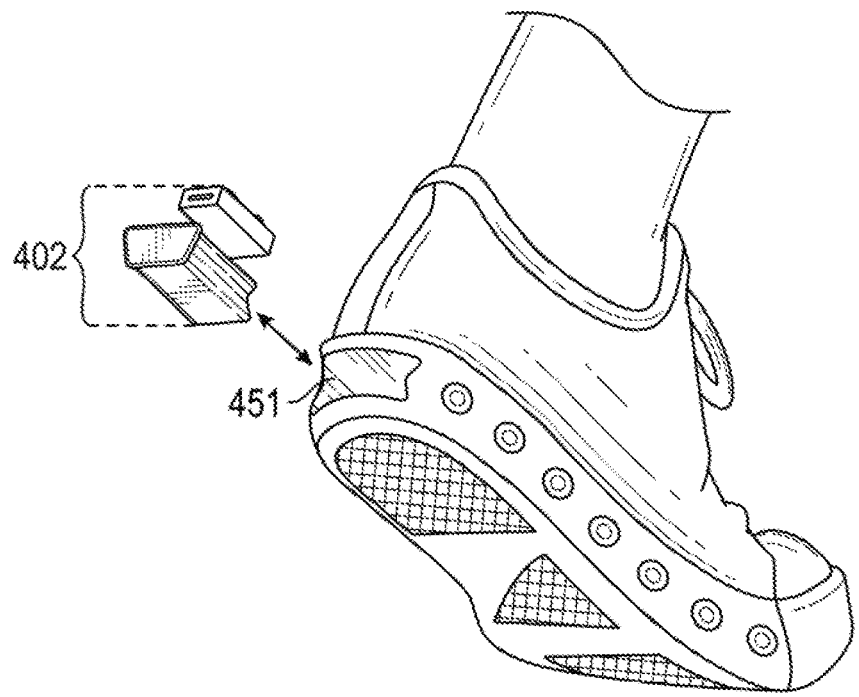
FIG. 4b is a rear perspective view of a removable portion of a tracking and monitoring device incorporated into a shoe.

As depicted in FIGS. 4*a* and 4*b*, the tracking device 402 may be at least partially removable from the sole 408. In this embodiment, the removable portion may include the sensor 407, the controller 412, the communication device 425, the battery 404, and the magnet 406 and solenoid 405 or magnet 406 and solenoid 405 pairs. This embodiment may allow for the tracking device 402 within the sole 408 to be easily repaired without having to replace the entire shoe 400. However, the removeable portion may generally conform with the look of the remaining sole 408 so as to maintain its inconspicuous nature.

In some embodiments as depicted in FIG. 4*a*, the tracking device 402 may fit into a drawer 450 within the sole 408. In other embodiments, as depicted in FIG. 4*b*, the entire tracking device 402 with accompanying componentry may fit into a void 451 within the sole 408. The void 451 may be sized to securely fit the tracking device 402 therein.

Figure 5:
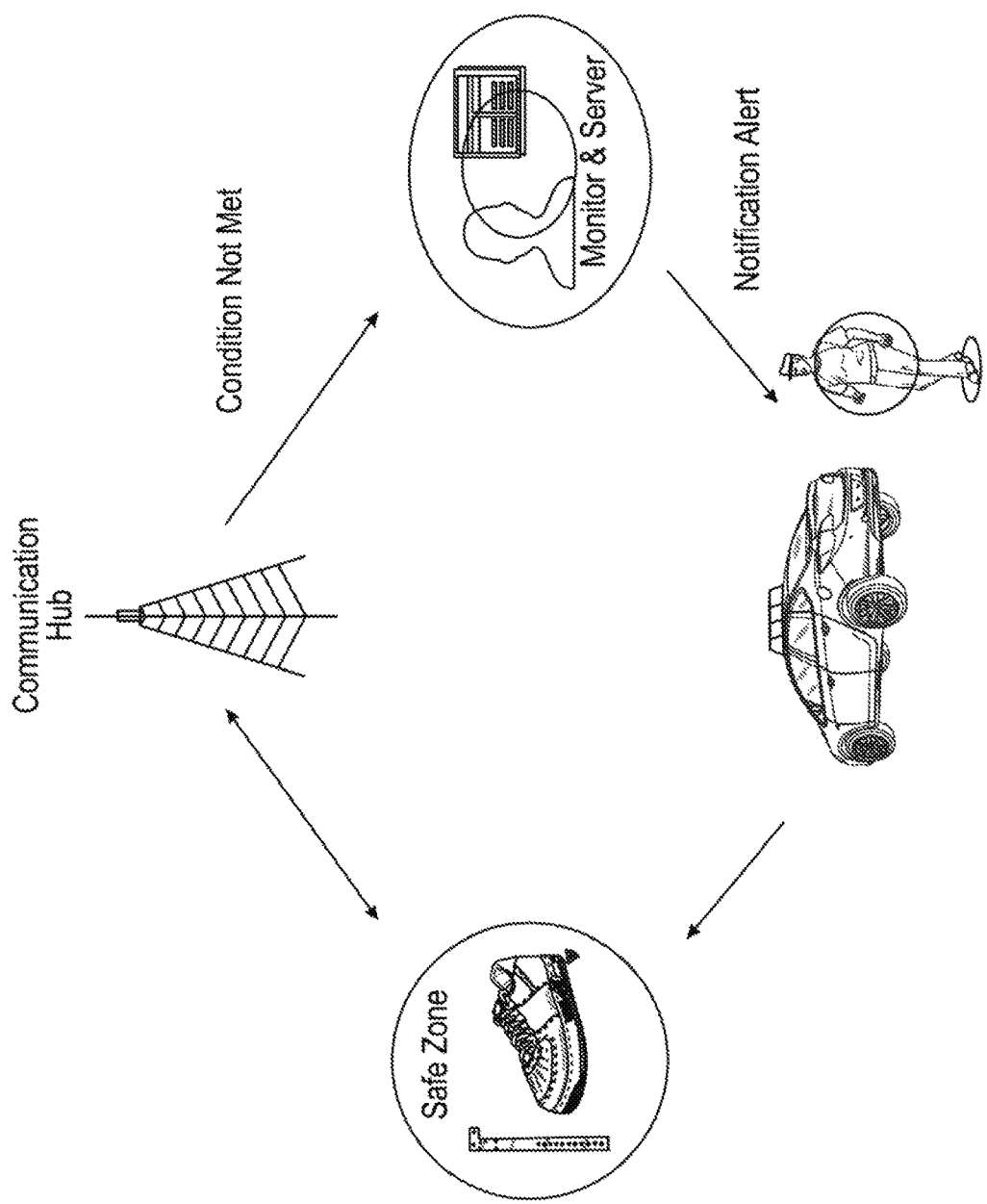
FIG. 5 is a schematic diagram showing use of a tracking system according to the present invention.
Figure 6:
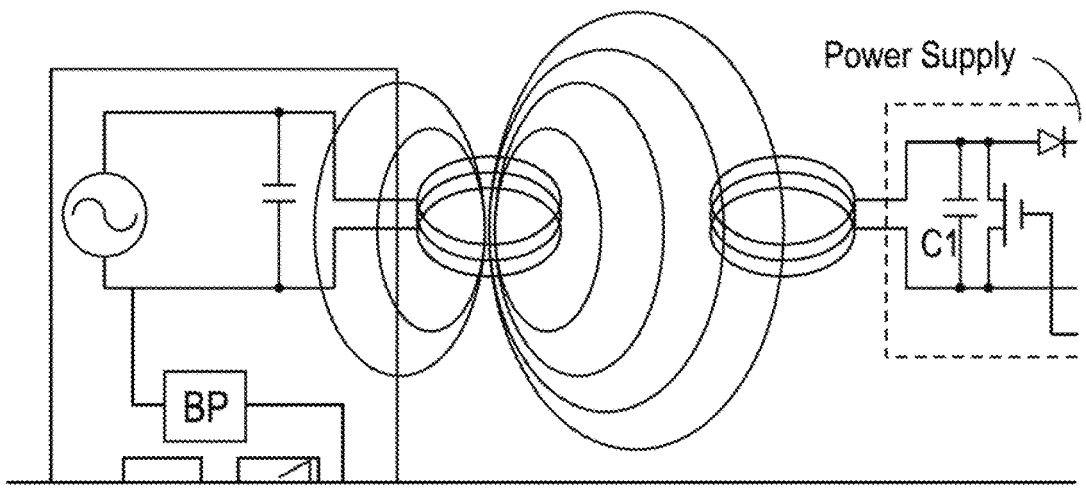
FIG. 6 is an electrical schematic diagram showing electrical connections of the tracking system according to the present invention.
Figure 7:
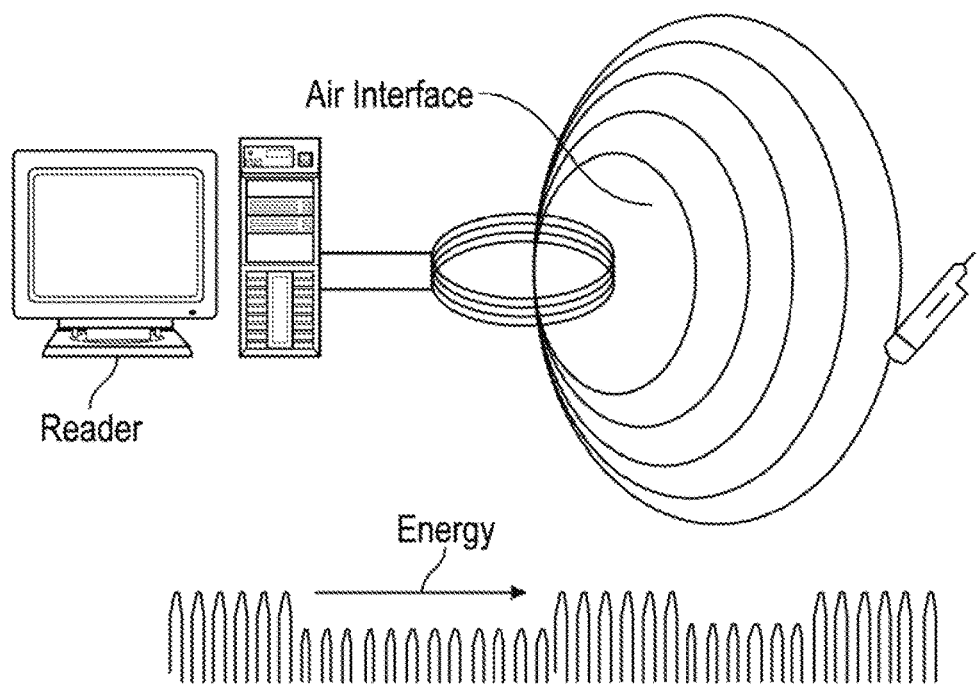
FIG. 7 is a schematic diagram showing how a tracking device of the tracking system may be energized and how it may transmit data.

Referring additionally to FIG. 5, operation of the tracking system 10 according to the present invention is now described in greater detail. After the tracking device having the controller 12, 412 associated therewith is configured, i.e., the fingerprint of the person to be located and other biometric information is uploaded to the database, the safe zones 18 that the person to be located may travel within may be set up. The database may also allow for entry of one or more rules associated with movement into and out of the safe zones 18. For example, the rules can be time-based, geographic base, or allow for manual overrides. The rules and preset standards may include appropriate actions or inactions taken by the device based on the time of day, day of the week, and distance away from the safe zone 18. The tracking device 30, 402 and the controller 12, 412 associated therewith may receive location information and deliver it to a web-based software application. In other words, the controller 12, 412 may be positioned in communication with a GPS system that allows for the location of the device and the controller 12, 412 associated therewith to be determined. The location information may be transmittable using a global communications network such as, for example, the GSM network 16.

Law enforcement agencies may be in communication with the GSM network 16 as well. Accordingly, upon detecting that the person to be located or, more specifically, the tracking device 30, 402 having the controller 12, 412 associated therewith is outside of a safe zone 18, and that one of the rules associated with the safe zone 18 is not in compliance, then an alert may be sent to the law enforcement agencies. This alert may, for example, include information regarding the person to be located. The information may include the biometric information that was originally uploaded to the database when the tracking device 30, 402 and the controller 12, 412 associated therewith was originally set up. The information that could also accompany such alert would include a picture of the person to be located, as well as any other information that may assist with locating the person.

The alert may also be configured to be sent to any other GSM device associated with a particular account for the controller 12, 412. In other words, and for example, the cell phone of a parent of a child that is to be wearing the tracking device 30, 402 having the controller 12, 412 associated therewith may receive an alert if the child is outside of a defined area and one of the rules is not in compliance. Therefore, if the tracking device 30, 402 having the controller 12, 412 associated therewith is located outside of a particular safe zone 18 during the time when the device is to be located within the safe zone 18, the alert may be automatically sent out.

The alert may be received via text message, e-mail, phone call, or any other number of ways for receiving a message having information associated therewith. In embodiments of the present invention, the tracking device 30, 402 may send an alert initially to a GSM device associated with the device having the controller 12, 412 associated there with. In some embodiments, the message may include a link to an audio recording of the tracked person's environment as detected by the microphone. In other embodiments, this may be streaming live audio of the person's environment that is being tracked. Upon receiving the alert, a user of the GSM device that receives the alert may choose to override the alert, or may choose to forward the alert to authorities. Further, it is anticipated that the GSM device will be positioned in communication with social networks. Accordingly, an update to a social media account of the user that receives an alert may be made, and the update may, for example, be the actual alert providing identification information associated with the person to be located, or may also include other information associated with the search for the person. This may include, for example, last known location, last person that the person to be located was with, etc. This advantageously allows for more people to receive the alert. Another option that the user may have is to forward the alert to law enforcement agencies. Accordingly, upon receiving the alert, the law enforcement agencies may begin their search for the person to be located. Further, multiple law enforcement agencies may work with one another to determine the location of the person to be found.

In another embodiment of the tracking system 10 according to the present invention, the tracking device 30, 402 having the controller 12, 412 associated therewith may include a microphone and speaker. The microphone may advantageously allow for an alert to be triggered by the person wearing or carrying the tracking device 30, 402. For example, and in the case of an abduction, it is contemplated that the person being abducted that has the tracking device 30, 402 with them can speak a certain word, or make a certain sound, or press a button associated with the tracking device 30, 402 having the controller 12, 412 incorporated therein to manually send an alert. In such a case, it is contemplated that the alert may be manually sent even if the device having the controller 12, 412 associated therewith is positioned within one of the preset safe zones 18.

It is also contemplated that the speaker of the tracking device 30, 402 having the controller 12, 412 associated therewith may be configured to make a sound. For example, the person to be located may be within a structure in the preconfigured safe zone 18, but others may not be able to locate such a person within the structure. In such a case, the tracking device 30, 402 may be accessed using a GSM device connected to the GSM network, and a request may be sent to play a sound so that the person to be located may be found.

It is contemplated that location information can be updated using any time intervals. For example, the location information may be updated every 5 minutes, every 1 minute, or any other period of time that may be desired.

The tracking device 30, 402 according to the present invention may advantageously be used to decrease response times associated with locating a missing person. This, in turn, advantageously increases the likelihood that the person is located prior to harm occurring to the person.

The present invention also advantageously allows for updates on search progress to be made to the database and viewed using any of the devices on the GSM network 16. For example, as law enforcement is notified of an alert that the person to be located is missing, updates as to the law enforcement search of the person to be located may be loaded to the database and viewed by a user.

The tracking system 10 according to the present invention may include software that is storable on a memory or a non-transitory computer readable medium. The software preferably utilizes an API application that may activate when there is an alert activation. Further, the software may be accessed via an assigned pin (personal identification number) for authorized users to gain access to the database. Upon being provided access, a user may readily view alerts. The alerts may, for example, include images for the location and recovery of the intended person for the user of the tracking device having the controller 12, 412 associated therewith.

Figure 8:
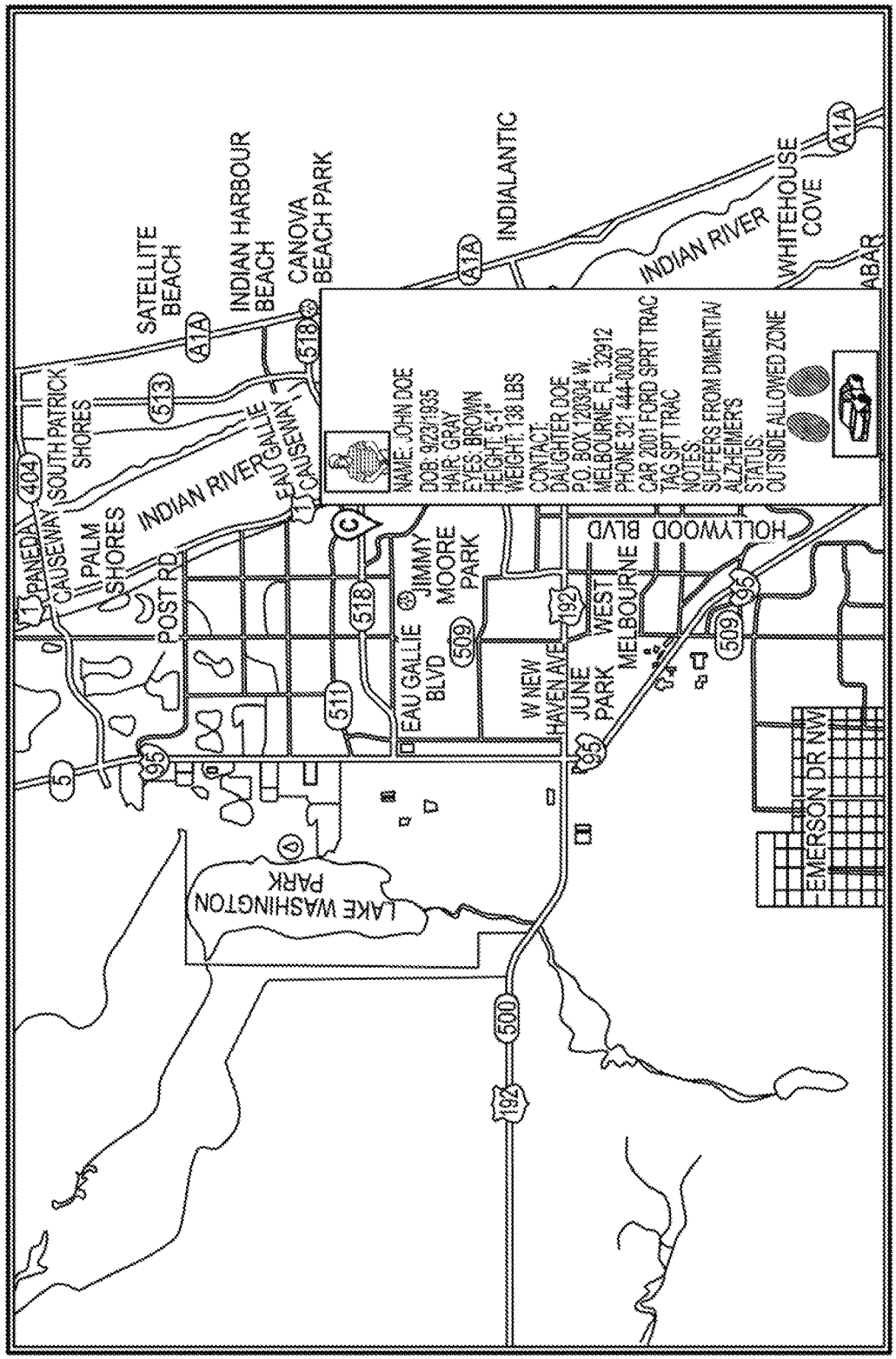
FIG. 8 is a depiction of an alert that is displayed using the tracking system according to the present invention.

A depiction of the alert as it may appear to a user is shown in FIG. 8. The image displayed may depict the type of information that may be needed for law enforcement when searching and/or attempting to recover a missing individual. These are exemplary depictions of the types of alerts that may be provided using the tracking system 10 according to the present invention. As illustrated, the alert may be associated with a position on a map, which may indicate the last location of the tracking device 30, 402 having the controller 12, 412 associated therewith. Further, it is understood that the tracking system 10 according to the present invention may provide real time updates as to the locations of the person to be located. This can be readily viewed on the map associated with the alert, along with all of the information relating to the person to be located. For example, the alert illustratively may include the picture of the person to be located, fingerprints, and other data that can be helpful in locating the missing person.

The software of the tracking system 10 according to the present invention may be provided by a mobile app. The mobile app may allow the user to enable and disable the device and also upload the images of the user, as well as any of the other biometric information of the person to be located into the secured database. More specifically, some mobile devices have fingerprint sensors associated therewith. The fingerprint sensor of the mobile device may be used to capture the fingerprint data of the person to be located. Alternately, a simple camera, which is included on most all smart phones, may be used to capture an image of a fingerprint, or other biometric data, and allow such data to be uploaded to the database.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A tracking and monitoring shoe comprising:
a tracking device comprising a controller;
a battery in electrical communication with at least one solenoid and at least one permanent magnet;
a plurality of lights;
a microphone; and
a speaker;
wherein the tracking device is implanted within a portion of the shoe, defined as a tracking section;
wherein the plurality of lights is configured to emit light from a sole of the shoe;
wherein the plurality of lights and the tracking device are electrically connected to the battery;
wherein the battery is configured to be rechargeable when a walking motion translates the at least one permanent magnet; and
wherein the tracking device is configured to activate the plurality of lights, microphone, and speaker when the tracking device detects the shoe has reached or transcended a boundary;
wherein the at least one solenoid is a plurality of solenoids and the at least one permanent magnet is a plurality of permanent magnets;
wherein a solenoid of the plurality of solenoids corresponds to a permanent magnet of the plurality of permanent magnets, defining a plurality of solenoid-magnet pairs; and
wherein the plurality of solenoid-magnet pairs are distributed in at least one of a vertical, horizontal, angled, and curved orientation with respect to a longitudinal axis of the shoe.

2. The tracking and monitoring shoe of claim 1 wherein the at least one solenoid and the at least one permanent magnet are vertically oriented with respect to a solenoid longitudinal axis; and wherein the at least one solenoid is configured as spring support for the shoe.

3. The tracking and monitoring shoe of claim 1 wherein the tracking device is configured to activate an alarm projected through the speaker when the shoe has reached or transcended the boundary.

4. The tracking and monitoring shoe of claim 3 wherein the alarm is a pre-recorded message.

5. The tracking and monitoring shoe of claim 1 wherein the controller further comprises at least one of a SIM card, a Bluetooth transmitter, a radio transmitter, and a WiFi transmitter and is operable to communicate pre-stored information to a central server when the shoe has reached or transcended the boundary; and wherein the pre-stored information includes at least one of fingerprints, photographic identification, aliases, health conditions, and home address.

6. The tracking and monitoring shoe of claim 1 wherein the plurality of lights is configured to emit a first colored light when the shoe has reached a distance within the boundary.

7. The tracking and monitoring shoe of claim 6 wherein the plurality of lights is configured to emit a second colored light when the shoe has reached or transcended the boundary.

8. The tracking and monitoring shoe of claim 1 wherein the plurality of lights is configured to blink when the shoe has reached a preset distance within the boundary.

9. The tracking and monitoring shoe of claim 1 further comprising one of a heat sensor and pulse monitor configured to detect whether the shoe has been removed from a user's body; and wherein the shoe is operable to transmit pre-stored information to a central server when a condition based on the shoe's removal has been met or unmet.

10. A tracking and monitoring apparel comprising:
apparel;
a tracking device comprising a controller;
a solenoid;
a magnet;
a plurality of lights;
a battery in electrical communication with the solenoid, the magnet, the plurality of lights, and the tracking device;
a microphone;
a speaker; and
at least one of a heat sensor and pulse monitor;
wherein the tracking device is connected to the apparel;
wherein the at least one of a heat sensor and pulse monitor is configured to detect whether the apparel has been removed from a user's body;
wherein the apparel is operable to transmit pre-stored information to a central server when a condition based on the tracking and monitoring the apparel's removal has been met or unmet;
wherein the plurality of lights is configured to emit light from the apparel;
wherein the battery is configured to be rechargeable when motion translates the magnet within the solenoid;
wherein the tracking device is configured to activate at least one of the plurality of lights, microphone, and speaker when the tracking device detects the apparel has transcended a boundary; and
wherein the apparel is configured to be worn as one of an article of clothing and a clothing accessory.

11. The tracking and monitoring apparel of claim 10 wherein the apparel is one of a shoe, a wrist band, an ankle band, a necklace, a headband, eyeglasses, a hair tie, a ring, socks, shoes, pants, a hat, or a shirt.

12. The tracking and monitoring apparel of claim 10 wherein the tracking device is configured to activate one of an alarm or pre-recorded message to project through the speakers when the apparel has reached or transcended the boundary.

13. The tracking and monitoring apparel of claim 10 wherein the controller is operable to communicate pre-stored information to a central server for processing when the apparel has reached or transcended the boundary; and wherein the pre-stored information includes at least one of fingerprints, photographic identification, aliases, health conditions, and home address.

14. The tracking and monitoring apparel of claim 10 wherein the plurality of lights is configured to emit a first colored light, defined as a caution light, when the apparel reaches a preset distance within the boundary.

15. The tracking and monitoring apparel of claim 14 wherein the plurality of lights is configured to emit a second colored light, defined as a warning light, when the apparel reaches or transcends the boundary.

16. The tracking and monitoring apparel of claim 10 wherein the plurality of lights is configured to blink when the apparel reaches a distance within the boundary.

17. A shoe sole comprising:
a tracking device comprising a controller;
a battery in electrical communication with a solenoid and a magnet;
a plurality of lights;
a microphone; and
a speaker;
wherein the tracking device is implanted within a sole of the shoe;
wherein the plurality of lights is configured to emit light from the shoe sole;
wherein the plurality of lights and the tracking device are electrically connected to the battery;
wherein the battery is configured to be rechargeable when motion translates the magnet within the solenoid;
wherein the tracking device is configured to activate at least one of the plurality of lights, microphone, and speaker when the tracking device detects the shoe sole has transcended a preprogrammed boundary;
wherein the tracking device is configured to be in communication with a web-based program including a database comprising biometric data of a wearer of the shoe sole including at least one of fingerprints, photographic identification, aliases, health conditions, and a home address into a database that is in communication with the controller;
wherein the controller is configured to be in communication with a global system for mobile communication network;
wherein the tracking device controller is configured to include a preprogrammed boundary, defined as a safe zone;
wherein the tracking device is configured to communicate with a web based program with preset rules regarding a distance of the tracking device to the preprogrammed boundary; and
wherein the tracking device is configured to send signal data to the web based program that an alert with the biometric data should be sent to a third party when one or more of the preset rules are not in compliance with a preset standard.

18. The shoe sole according to claim 17 wherein the preset rules rely on at least one of a time of day, a day of the week, a distance away from the safe zone, and manual override.

19. The shoe sole according to claim 17 wherein at least a portion of the shoe sole is removable; and wherein the removable portion comprises at least one of the tracking device, the controller, the battery, the magnet, the solenoid, a communication device, and a sensor.

* * * * *